United States Patent [19]
Shafer

[11] Patent Number: 6,094,238
[45] Date of Patent: Jul. 25, 2000

[54] APPARATUS AND METHOD FOR TIME BASE COMPENSATED INFRARED DATA TRANSMISSION

[75] Inventor: Kirk E. Shafer, Mission Viejo, Calif.

[73] Assignee: Mitsubishi Digital Electronics America, Inc., Norcross, Ga.

[21] Appl. No.: 08/775,085

[22] Filed: Dec. 30, 1996

[51] Int. Cl.[7] .................................................. H04N 5/44
[52] U.S. Cl. ........................................... 348/734; 359/142
[58] Field of Search .............................. 348/734; 381/53, 381/50, 72, 74, 237, 253; 455/115, 119; 340/825.72, 825.57; 359/142–147; H04N 5/44

[56] References Cited

U.S. PATENT DOCUMENTS

| | | | |
|---|---|---|---|
| 4,150,284 | 4/1979 | Trenkler et al. | 455/608 |
| 4,232,297 | 11/1980 | Gerlach et al. . | |
| 4,377,006 | 3/1983 | Collins et al. | 455/603 |
| 4,482,947 | 11/1984 | Zato et al. | 455/603 |
| 5,257,288 | 10/1993 | Moser | 375/375 |
| 5,589,893 | 12/1996 | Gaughan et al. | 348/734 |
| 5,640,160 | 7/1997 | Miwa . | |
| 5,850,597 | 12/1998 | Tanaka et al. | 455/115 |

FOREIGN PATENT DOCUMENTS

| | | | |
|---|---|---|---|
| 0234948 | 9/1987 | European Pat. Off. | 358/194.1 |

*Primary Examiner*—Michael H. Lee
*Attorney, Agent, or Firm*—Lyon & Lyon LLP

[57] ABSTRACT

Methods and apparatus for use in communication between a remote control and a receiving unit provide power saving modes of operation and enable remote control use of high data generating devices, such as a trackball. A pulse position modulation protocol is provided in which the position of a single pulse, such as an infrared pulse is located in time in one of three or more locations. In the preferred embodiment, the pulse is provided at least in one of eight states, and more preferably in one of sixteen states. In the latter arrangement, a single bit provides for a hex data output by a single pulse. In this way, a single pulse may substitute for what otherwise would have been multiple pulses in a binary protocol. Power savings may be achieved through this method. A time base compensation method is provided in which the remote control provides two detectable events separated by a predetermined time as measured by the remote control time base or clock. The receiving unit measures the time difference between the two events as determined by the receivers time base or clock. A correction factor is then applied to subsequent detections of time differences between events as sent by the remote control. In the preferred embodiment, a multiplicative factor is applied. Dual protocol remote control devices may be provided wherein a first protocol is utilized in conjunction with a second protocol comprising the pulse position modulated system, such as the hex based system. In this manner, a binary protocol may be utilized for lower channel or lower data transfer arrangements and the pulse position modulation protocol may be utilized for relatively high data generating devices, such as a trackball. The protocol is advantageously utilized with high key identification numbers, such as those above 255.

12 Claims, 4 Drawing Sheets

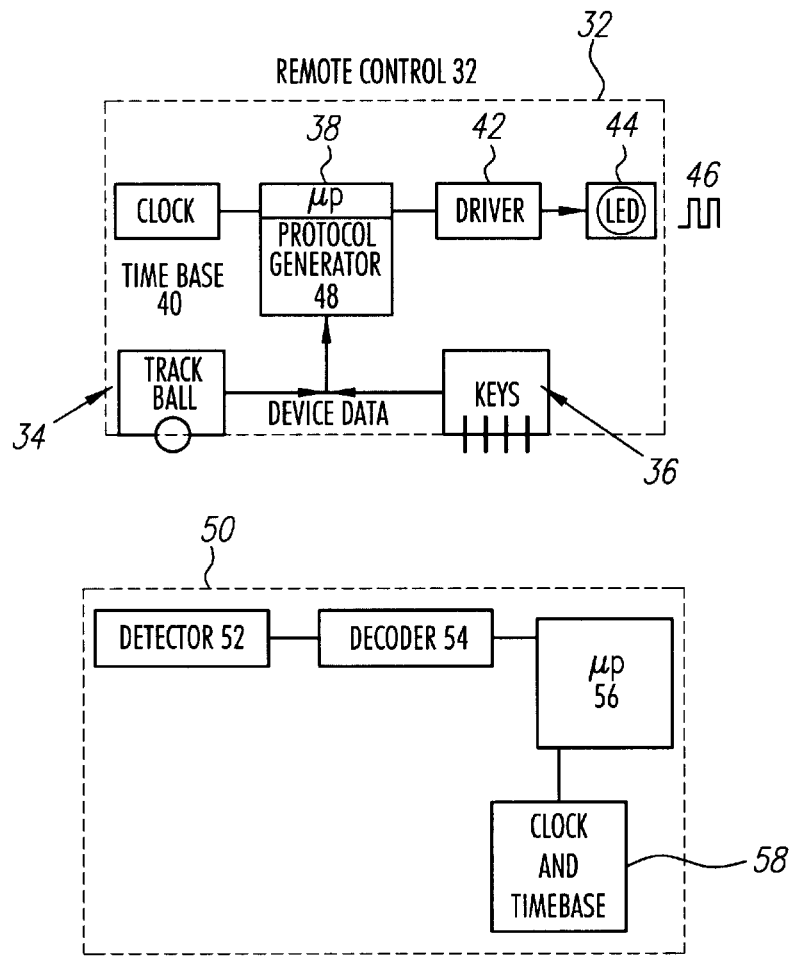
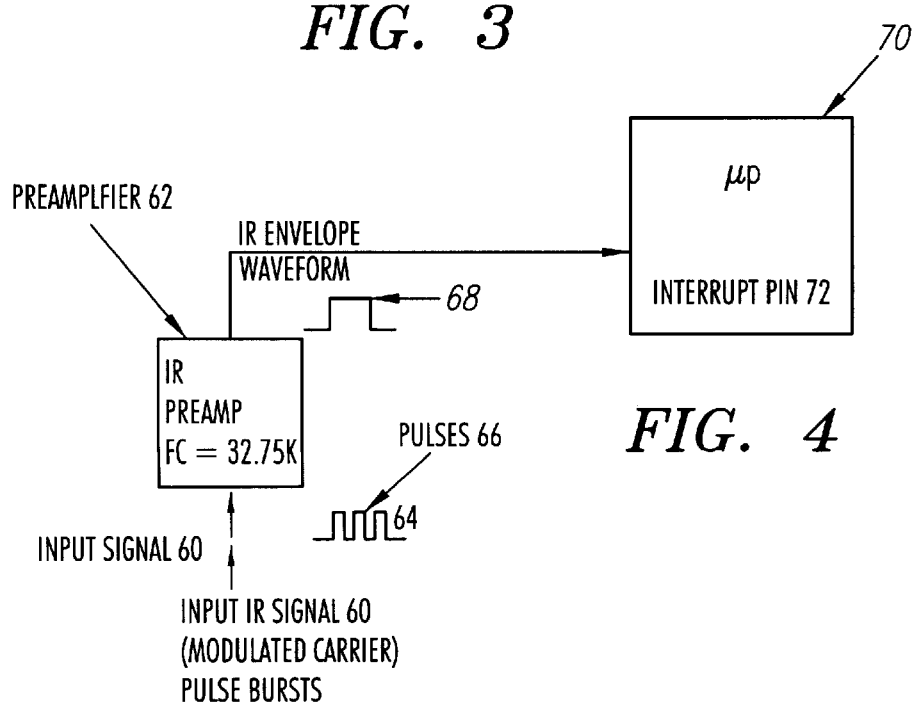
FIG. 3
FIG. 4

APPARATUS AND METHOD FOR TIME BASE COMPENSATED INFRARED DATA TRANSMISSION

FIELD OF THE INVENTION

This invention relates to the field of remote control devices, such as infrared transmission devices. The invention particularly relates to remote controls for televisions and the like, and most particularly for remote controls with higher data content, such as those including a trackball.

1. Related Application Information

This application is related to the following applications filed on the same date as the instant application: "Pulse Position Modulation Protocol, Ser. No. 08/777,507", "Dual Protocol Remote Control System, Ser. No. 08/777,500", and "Remote Control With Sealable Trackball, now issued as U.S. Pat. No. 5,917,631", all of which are incorporated herein by reference as if fully set forth herein.

2. Background of the Invention

Remote controls enable the user of a consumer electronic device to effectively operate that device from a distance without a tethered connection between the remote control and the device. Television sets have conventionally used remote controls for years. Other consumer electronic devices, for example, computers, interactive CD disc players, and stereo equipment, have also been utilized with remote controls.

Generally, conventional remote controls have utilized an infrared transmitter to generate a pulse train sent from the remote control to the receiver on the controlled device. Typically, each key corresponded to a unique sequence, most conventionally a binary sequence, which was transmitted to the receiver. FIG. 1 shows a prior art system for the representation of binary data. A three pulse train has a baseline level 10 at a first state and a "on" or high state at a second state. Pulse position modulation techniques conventional in the prior art utilize the time difference between the leading edges of pulses. As shown, a 600 microsecond+/-200 microsecond duration pulse 12 has a difference in time to the leading edge of pulse 14 of 1.22 ms+/-600 microseconds. This time difference represents a logic "0". The time difference between the leading edge of pulse 14 and pulse 16 is 2.44 ms+/-600 microseconds, representing a logic "1". A binary pulse train be generated by sequentially forming pulses whose time delay from the preceding pulse were within one of the two time duration windows.

The ratio of the time difference for a logic 1 relative to a logic 0 is two. This ratio is relatively large, and is relatively unaffected by slight differences in clock speed between the clock or time base of the remote control and the clock or time base of the receiver. Deviation or drift in the clock rate rarely would have an impact upon the accuracy of the system.

Modern remote controls must transmit substantial amounts of information. Often times, a remote begins a transmission with a header identification of the type of remote, such as identifying a particular manufacturer and model of remote. The receiver may then use this information to decode the subsequent transmission. The most feature laden remote controls currently have hundreds, sometimes over 250, keys or states of control. Beyond the conventional modes of control, various higher data generating control devices, such as trackballs, have been incorporated in remote controls.

The demands placed upon remote controls by these new functionalities are underserved by the current transmission formats. Further, as the current formats are extended to address the higher data transfer requirements of current and future devices, the power consumption, and battery drain, increase. It is the object of this invention to provide a new data transmission format consistent with the increase in the quantity of data transmitted and to reduce power consumption.

SUMMARY OF THE INVENTION

Methods and apparatus are provided for generating a time base compensated data transmission protocol in which power consumption is reduced and increased data rate facilitated. In one aspect of this invention, a method is provided for communication between a remote control and a receiver in which the time base for the remote control and the receiver may be correlated. In the preferred embodiment, the remote control transmits a signal to the receiver where the signal includes transitions having a predetermined time difference as determined by the timer or time base in the remote control, the receiver receiving the signal and measuring the time difference between the transitions as determined by a timer in the receiver, and subsequently, applying a correction factor based upon the relative time differences as determined by the remote control and the receiver. By way of example, if the time base or clock of the remote control generated and transmitted two pulses having leading edges differing by 100 ms as determined by the remote control time base, and if the difference in time between the transitions as measured by the receiver was 100+a ms, then a correction factor could be applied to account for the time difference a. For example, applying the multiplicative factor 100/(100+a) would compensate for the difference in the time base between the remote control and the receiver.

The protocol for achieving significant power savings in accordance with this invention utilizes a single pulse at a time indicative of at least three or more states. In the preferred embodiment, rather than transmitting a 4 bit binary number, a single pulse in hex (base 16) format is utilized. A pulse is generated at a predetermined time after a reference pulse, indicative of one of the 16 states in the hex packet. Thus, the same information may be transferred, but with significantly fewer pulses, which corresponds to less energy drain on the battery of the remote control.

The power reduction protocol and time base compensation methods are advantageously used with higher functionality remote controls. For example, a remote control having in excess of 255 functions, or a high data production device such as a trackball may advantageously utilize these methods. In the case of a trackball, in the preferred embodiment, the system transmits the x and y positional indication from the trackball in four hex packets, preferably as a hex number for the high order bits and a hex number for the low order bits, for both the x and y positions. Optionally, a leader or header sequence is provided to uniquely identify the remote control and the protocol to the receiver. A device code may also be included within the data stream so as to identify the type of device, such as an indication as to whether a trackball or key board is transmitting data.

In yet another aspect of this invention, a dual protocol remote control system is provided. A first set of input devices, such as direct key entry of channels, volume, user defined lists and the like, are transmitted from the remote control to the receiver by a first protocol, and at least one second input device, such as a trackball or other high data transmission device, is transmitted by a second protocol. In the preferred embodiment, the second protocol is the reduced power consumption protocol of this invention.

In the preferred embodiment, the power reduction protocol utilizes an error detection scheme including a check sum bit. When the error arises because the single pulse is detected in an incorrect position, the sum of the transmitted packets, such as hex packets, may change. An apparatus is provided for use in accordance with the preferred methods of this invention. A remote control for use in a transmission system preferably includes a high data generation device, such as a trackball, a transmitter, such as an infrared transmitter, a power source, such as a battery, a time base and a protocol system. In the preferred embodiment, the protocol system generates a waveform supplied to the transmitter which generates a signal having transitions separated by a predetermined period of time as measured by the remote control time base.

The protocol system preferably further serves to generate a reduced number of pulses compared to a binary pulse train, such as by generating a single pulse at a time after a reference time whose position indicates at least one of three states, more preferably four states, most preferably sixteen states (representing a hex number). The remote control apparatus may further include an alternate protocol utilized with selected input devices. For example, direct entry of a channel may generate a binary pulse train indicative of that channel selection and a high data rate device such as a trackball may utilize the power saving protocol of this invention. In this way, a dual protocol system may be implemented.

Accordingly, it is an object of this invention to provide a remote control and methods of operation which reduce power or energy drain on the remote controls batteries.

It is yet a further object of this invention to provide a transmission protocol in which a relatively large amount of data may be transmitted with relatively little energy.

It is yet a further object of this invention to provide a multiple protocol remote control in which the protocol may be selected in accordance with other constraints, such as speed or power consumption.

It is yet another object of this invention to provide a protocol capable of providing a remote control with enhanced functionality.

BRIEF DESCRIPTION OF THE DRAWINGS

FIG. 3 is a schematic representation of components of a remote control and receiver system.

FIG. 4 is a component block diagram of the receiver.

DETAILED DESCRIPTION OF THE INVENTION

Figure 1:
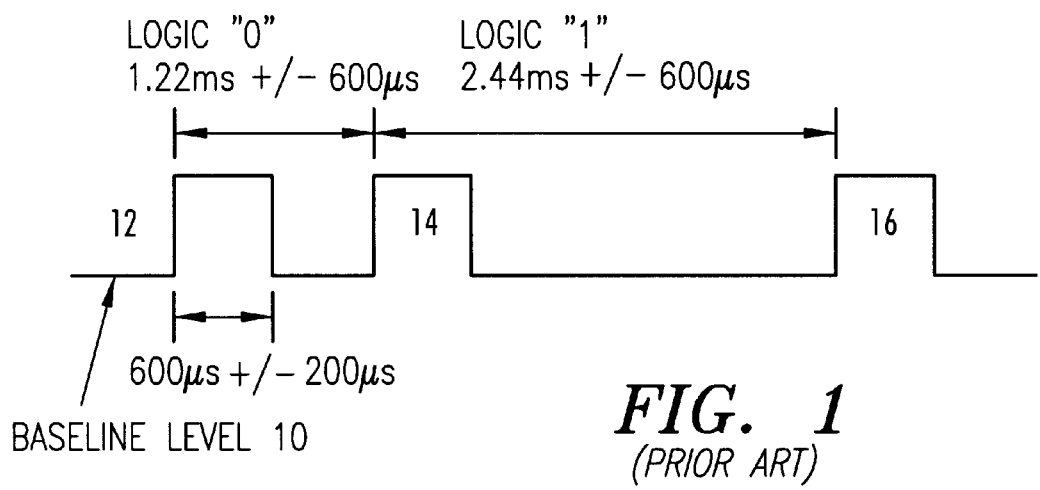
FIG. 1 shows a graph of the prior art binary pulse protocol.
Figure 2:
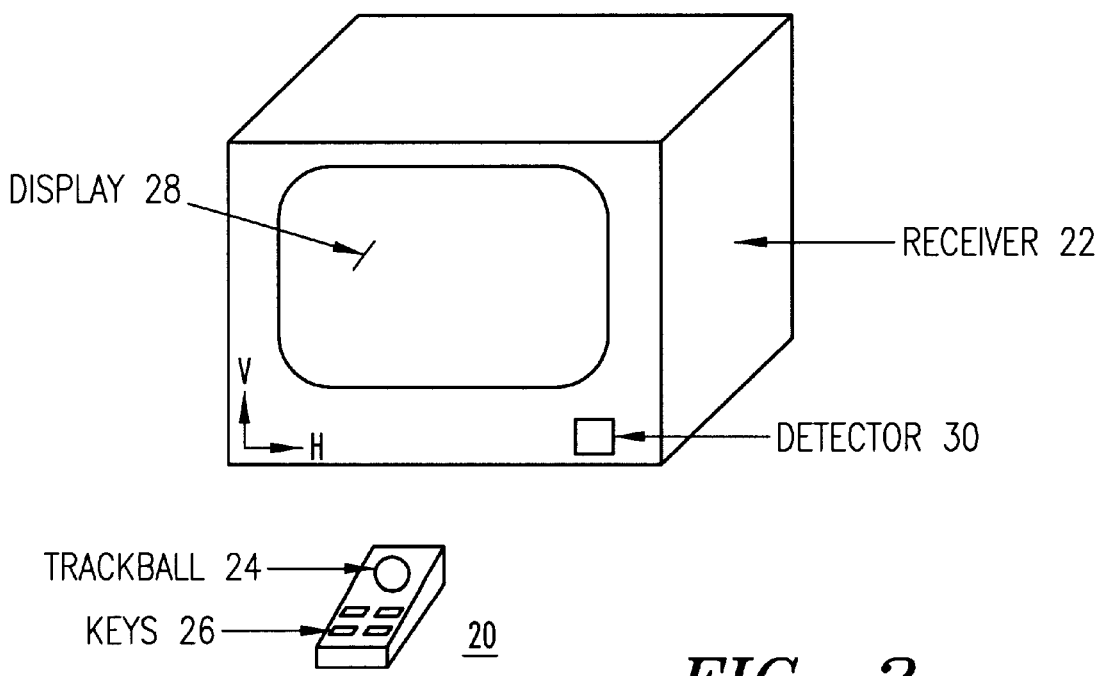
FIG. 2 shows a prospective view of a remote control including a trackball and a television.

FIG. 2 shows a perspective view of a remote control 20 and receiver 22. The receiver 22 may be any device controllable by a remote control 20 such as a television set, stereo equipment, interactive compact disc player or other consumer electronic device. As depicted, the remote control 20 includes a trackball 24 as one mode of user input. Rotation of the trackball 24 causes transmission of the rotation information at the trackball 24 to the receiver 22, which is utilized to move a display item 28 (shown as an arrow on receiver 22). The receiver 22 includes a detector 30 for receiving and detecting the output of the remote control 20, most preferably an infrared receiver or detector 30.

FIG. 3 shows a block diagram representation of a remote control and receiver system. The remote control 32 includes user input devices, such as a trackball 34 and keys 36 as device data input to a microprocessor or microcontroller 38. A clock or time base 40 provides time signals to the processor 38, which implements the methods described further below. The processor 38 provides an output to driver 42 which in turn causes the transmission device, such as the light emitting diode 44 to generate radiation 46 which is directed to receiver 50. The detector 52 receives the radiation 46 and provides it to decoder 54, which in turn provides input to processor 56. The processor 56 is preferably a microprocessor or microcontroller. A clock or time base 58 for the receiver 50 provides a time reference for the receiver 50. A protocol generator 48 generates the sequence and timing of protocol signals, for the power reduction protocol or the time base compensation packet, preferably through operation of the processor 38 in combination with a control program.

FIG. 4 shows a block diagram view of the receiver. The input signal 60 is incident upon the preamlifier 62. In the preferred embodiment, the preamplifier 62 has a frequency response sufficient to detect the incoming waveform. The waveform 64 is depicted as having multiple pulses 66 which results in an output waveform 68 when an envelope waveform is generated. The output of the preamplifier 62 is provided to the receiver side microprocessor 70 via an interrupt pin 72.

Figure 5:
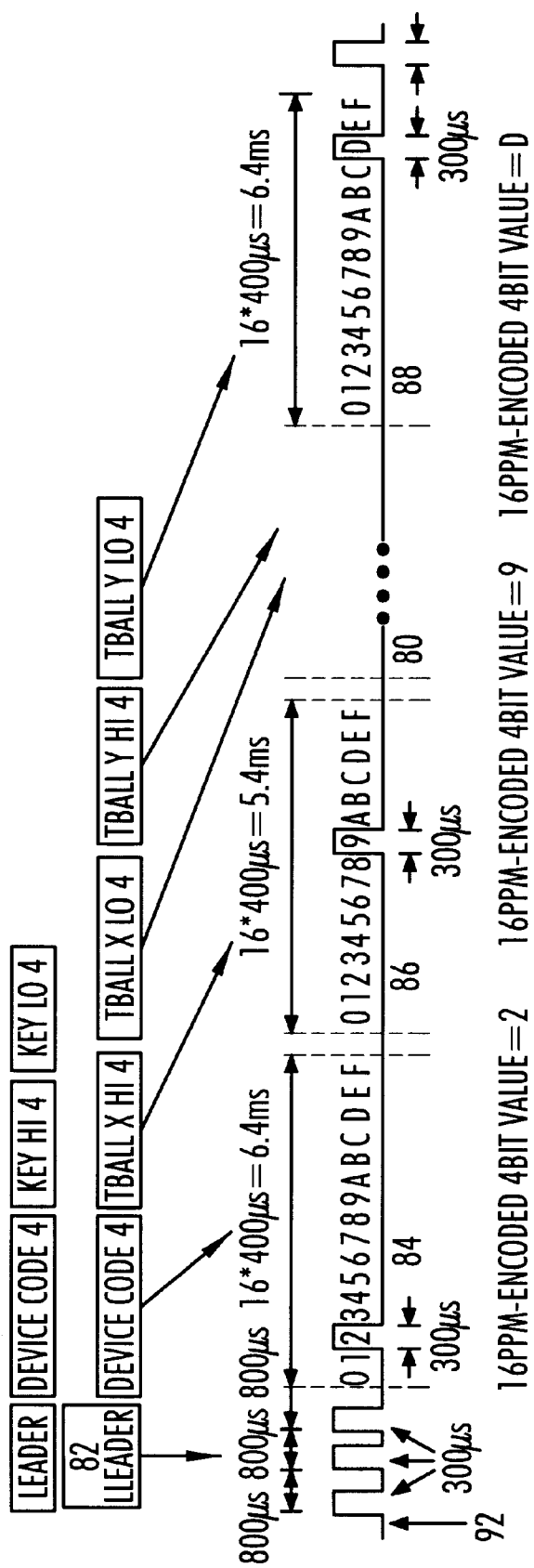
FIG. 5 is a graphical representation of the physical encoding format having reduced power consumption.

FIG. 5 shows a graphical representation of the physical encoding format of this invention. Typically, a leader sequence 82 is utilized to synchronize the start of the pulse train 80 as received by the receiver. Preferably, the leader configuration is chosen to ensure uniqueness, such as through the use of a three pulse triplet. Such a pulse triplet would not occur elsewhere in the pulse train 80 regardless of actual data content. A first nonbinary data packet 84 follows the leader 82, when present. By "nonbinary" data packet is meant a packet having a single pulse occuring at one of three or more discernable times after a reference time. In the preferred embodiment, the nonbinary data packet is a hex (base 16) packet in which one of the 16 states is selected. Packet 84 has the number 2 selected. The next or second data packet 86 has the number 9 selected. Any number of intervening data packets may be utilized, depicted in FIG. 5 by the repetitive dots. A final data packet 88 is shown where the hex number D is selected.

The content of the pulse train 80 would vary depending on the devices contained within the remote control. In the case of a trackball, the following would be one mode in which data could be transmitted. The first packet 84 could include a device code, for example where the number 1 indicated a keyboard input and the number 2 indicated a trackball input. The second packet 86 could be the trackball x position high order bits. Four binary bits, such as supplied from certain trackball systems, would comprise one hex number. The next data packet could be the trackball x position low bits, followed by the trackball y position high bits and finally the trackball y position low bits.

Preferably, a dead time 92 precedes the leader. This ensures the receiver side synchronization to the leader 82, such as the triplet. Considering representative times, the time for a trackball packet as described previously would be 0.8 ms for the dead time 92, 3×0.8 ms for the synchronization triplet 5×6.4+0.4 ms for the data packet 84, 86 and the 0.4 ms dead time between packets 84, 86, plus 2×0.4 ms for a total of 38 ms. As shown, the pulse width is 400 microseconds, but this duration is optional, and may be for example, 300 microseconds. A shorter pulse may further conserve transmitter battery life. Generally, it is the leading edge position which is important for the timing detection, not the actual pulse width.

Preferably, a error detection system is utilized. In the preferred embodiment, a check sum bit 90 is utilized. The various data packets 84, 86 and 88 have values which are then summed and the least significant bit is encoded as the check sum bit 90. This position has two valid positions, position 0 meaning check sum is 0 and position 1 meaning check sum is 1.

Figure 6:
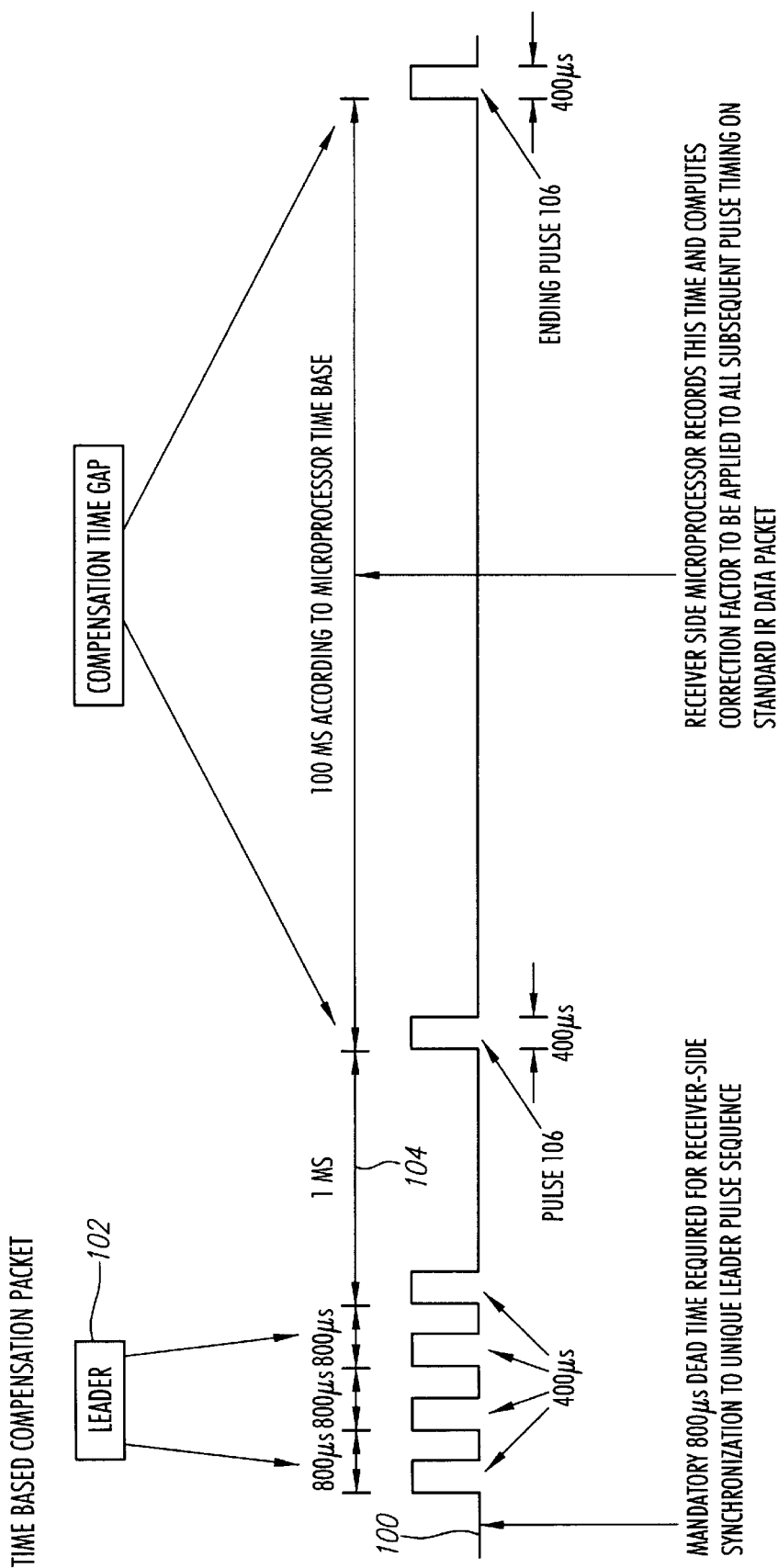
FIG. 6 is a graphical representation of the time base compensation packet.

FIG. 6 shows a graphical representation of the time base compensation packet. A dead time 100 precedes a leader sequence 102, preferably comprising a triplet of equally spaced pulses. A first time interval 104, depicted as 1 ms, is the time difference between the last pulse of the leader 102 and the pulse 106. Ending pulse 108 is generated at a predetermined period of time after the initial pulse 106. Generally, the difference in times between the leading edges of pulse 106 and ending pulse 108 comprise the predetermined time difference as generated by the clock or time base 40 (FIG. 3) of the remote control 32. The receiver 50 determines the difference in time between the received pulses 106, 108 and determines according to the receiver clock or time base 58 the detected duration of the time base compensation packet. A correction factor, such as a multiplicative correction factor is applied to future received pulse position modulation packets. In this way, the accuracy of the information in the pulse position modulation pulse train may be accurately detected. This is so even though the time basis for the remote control and receiver are running at different speeds. As long as the time base or clock 40 of the remote control 32 remains stable between the generation of successive time base compensation packets, the correction factor applied by the receiver accounts for the difference in clock speed. In this way, the relatively long times required by the pulse position modulation system of this invention may be achieved.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

I claim:

1. A method for communicating between a remote control having a timer and a receiver having a second timer, different from the timer in the remote control comprising the steps of:

transmitting a signal from the remote control to the receiver where the signal includes transitions having a predetermined time difference as determined by a timer in the remote control, receiving the signal at the receiver and measuring the time difference between the transitions as determined by a timer in the receiver, calculating a correction factor based in part on the predetermined time difference and the measured time difference as determined by the timer in the receiver, and applying in the receiver the correction factor based upon the relative time differences as determined by the remote control and the receiver.

2. The method of claim 1 for communicating between a remote control and a receiver wherein the correction factor is a multiplicative factor.

3. The method of claim 2 for communicating between a remote control and a receiver wherein the multiplicative factor is the ratio of the time difference as determined by the timer in the remote control divided by the time difference between the transitions as determined by the timer in the receiver.

4. The method of claim 2 for communicating between a remote control and a receiver further including the step of utilizing a single pulse at a predetermined time after a reference time where the time indicates at least one of four states.

5. The method of claim 4 for communicating between a remote control and a receiver wherein the time indicates at least one of eight states.

6. The method of claim 4 for communicating between a remote control and a receiver wherein the time indicates at least one of sixteen states.

7. The method of claim 4 for communicating between a remote control and a receiver where the time indicates a hex-number.

8. A method for communicating between a remote control and a receiver comprising the steps of:

transmitting a signal from the remote control to the receiver where the signal includes transitions having a predetermined time difference as determined by a timer in the remote control, receiving the signal and measuring the time difference between the transitions as determined by a timer in the receiver, and applying a multiplicative correction factor including the ratio of the time difference as determined by the timer in the remote control divided by the time difference between the transitions as determined by the timer in the receiver.

9. The method of claim 8 for communicating between a remote control and a receiver further including the step of utilizing a single pulse at a predetermined time after a reference time where the time indicates at least one of four states.

10. The method of claim 8 for communicating between a remote control and a receiver wherein the time indicates at least one of eight states.

11. The method of claim 8 for communicating between a remote control and a receiver wherein the time indicates at least one of sixteen states.

12. The method of claim 8 for communicating between a remote control and a receiver where the time indicates a hex-number.

* * * * *